(12) United States Patent
Ovsiannikov et al.

(10) Patent No.: US 8,648,945 B2
(45) Date of Patent: Feb. 11, 2014

(54) IMAGE SENSORS FOR SENSING OBJECT DISTANCE INFORMATION BASED ON CLOCK SIGNALS

(75) Inventors: Ilia Ovsiannikov, Pasadena, CA (US); Yoon-dong Park, Yongin-si (KR); Dong-ki Min, Seoul (KR); Young-gu Jin, Osan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 588 days.

(21) Appl. No.: 12/954,835

(22) Filed: Nov. 26, 2010

(65) Prior Publication Data

US 2011/0129123 A1    Jun. 2, 2011

(30) Foreign Application Priority Data

Nov. 27, 2009    (KR) .................... 10-2009-0115919

(51) Int. Cl.
*H04N 3/14*    (2006.01)
*H04N 5/335*    (2011.01)
*H04N 7/18*    (2006.01)
*G01C 3/08*    (2006.01)

(52) U.S. Cl.
USPC ................... 348/294; 348/135; 356/4.01

(58) Field of Classification Search
None
See application file for complete search history.

(56) References Cited

U.S. PATENT DOCUMENTS

| 7,095,487 | B2 |  | 8/2006 | Gonzalez-Banos et al. |
| 7,450,220 | B2 |  | 11/2008 | O'Connor et al. |
| 7,462,808 | B2 |  | 12/2008 | Lustenberger et al. |
| 7,498,621 | B2 |  | 3/2009 | Seitz |
| 2002/0084430 | A1 | * | 7/2002 | Bamji et al. ............. 250/559.05 |
| 2006/0176469 | A1 | * | 8/2006 | O'Connor et al. ........... 356/5.11 |
| 2008/0157012 | A1 | * | 7/2008 | Tachino et al. .............. 250/552 |
| 2008/0231832 | A1 | * | 9/2008 | Sawachi ........................ 356/5.1 |
| 2009/0284731 | A1 | * | 11/2009 | Jin et al. ....................... 356/4.01 |
| 2010/0033611 | A1 | * | 2/2010 | Lee et al. ...................... 348/302 |
| 2010/0046802 | A1 | * | 2/2010 | Watanabe et al. ............. 382/106 |
| 2010/0073462 | A1 | * | 3/2010 | Lee et al. ......................... 348/46 |

* cited by examiner

*Primary Examiner* — Justin P Misleh
(74) *Attorney, Agent, or Firm* — Harness, Dickey & Pierce, P.L.C.

(57) ABSTRACT

An image sensor includes a clock signal generator configured to generate and output at least first and second clock signals, a plurality of pixels configured to generate associated distance signals based on corresponding clock signals from among the at least first and second clock signals and light reflected by an object, and a distance information deciding unit configured to determine distance information with respect to the object by using the associated distance signals. At least one first pixel from among the plurality of pixels is configured to generate the associated distance signal based on at least the first clock signal, and at least one second pixel from among the plurality of pixels, which is adjacent to the at least one first pixel, is configured to generate the associated distance signal based on at least the second clock signal.

16 Claims, 10 Drawing Sheets

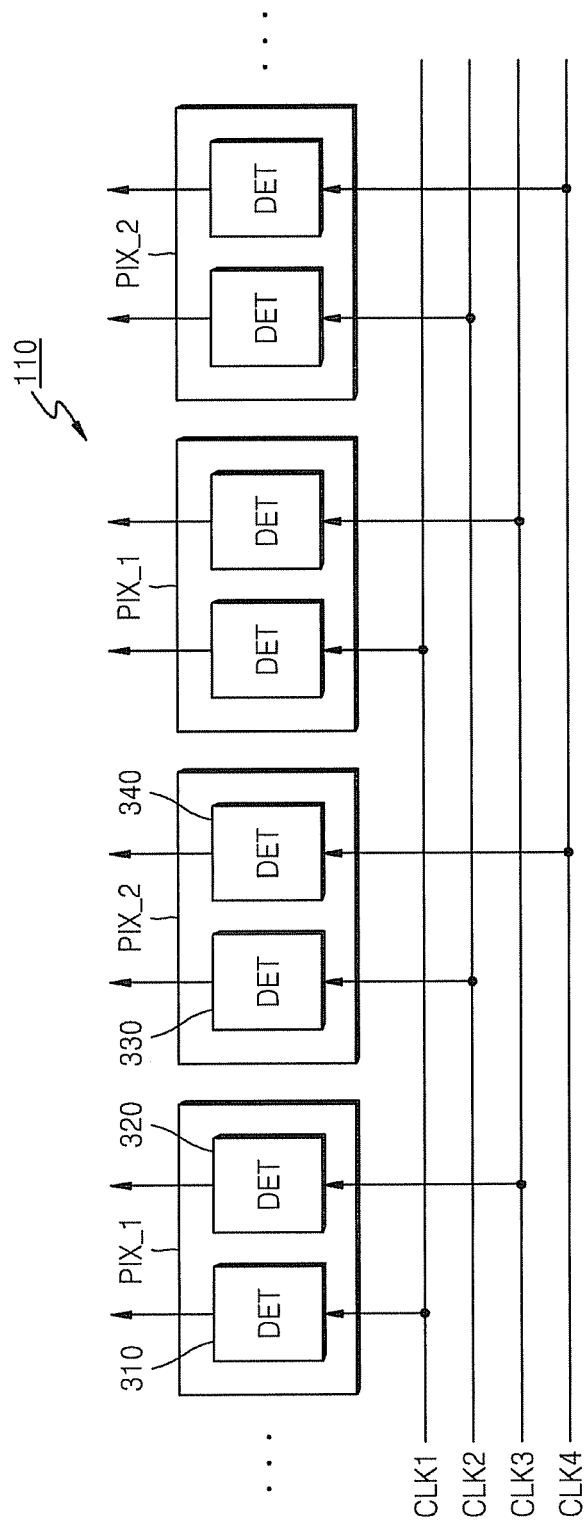

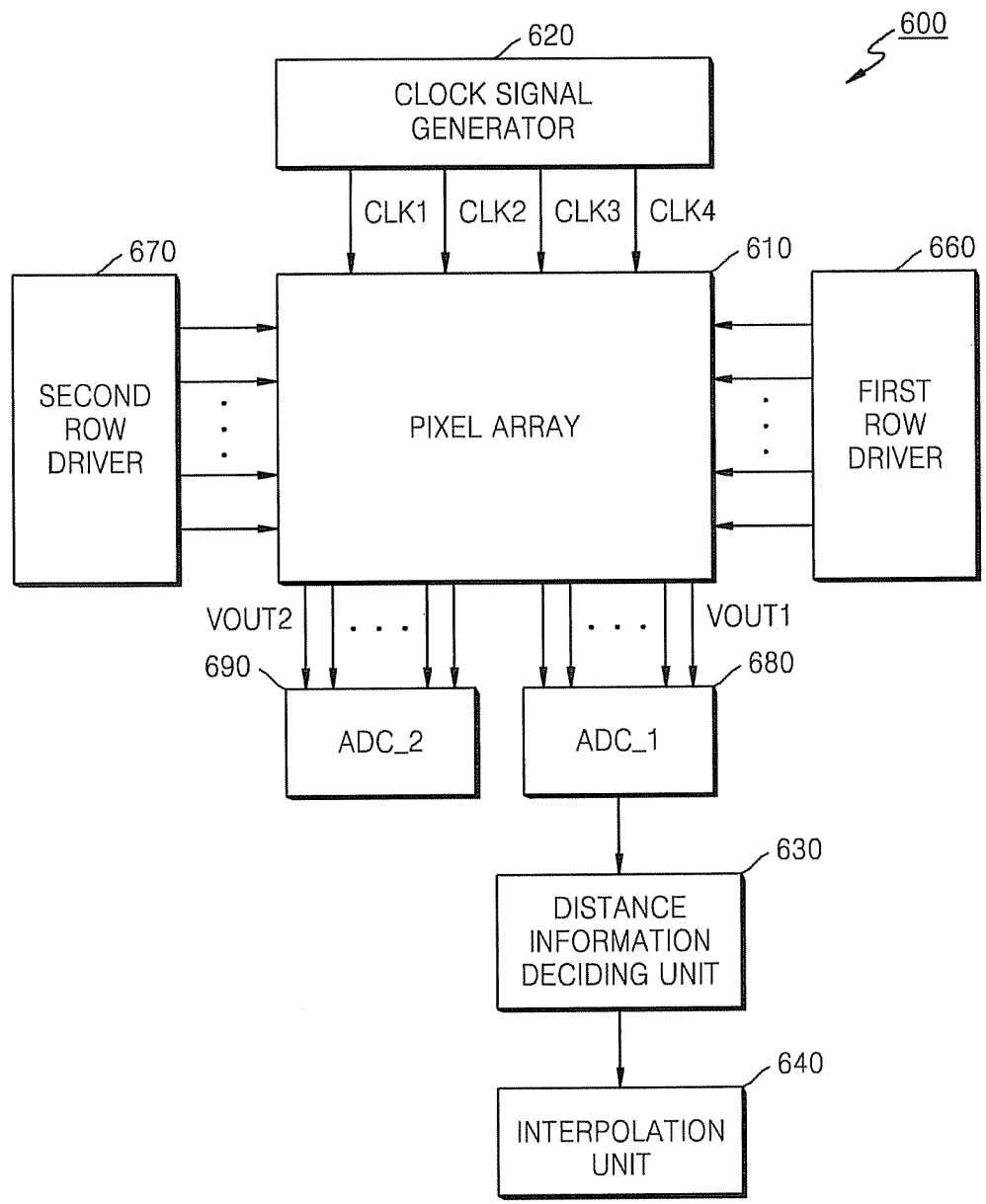

IMAGE SENSORS FOR SENSING OBJECT DISTANCE INFORMATION BASED ON CLOCK SIGNALS

CROSS-REFERENCE TO RELATED APPLICATIONS

This application claims priority under 35 U.S.C. §119 to Korean Patent Application No. 10-2009-0115919, filed on Nov. 27, 2009, in the Korean Intellectual Property Office, the entire contents of which are incorporated herein by reference.

BACKGROUND

Inventive concepts relate to image sensors, and more particularly, to image sensors for sensing object distance information.

Image sensors are equipped in handheld phone camera modules or digital still cameras, capture images, convert the images into electrical image signals, convert the converted image signals into digital signals, and transmit the digital signals. An image sensor may sense color information or distance information with respect to an object.

SUMMARY

According to an aspect of inventive concepts, there is provided an image sensor including a clock signal generator configured to generate and output at least first and second clock signals, a plurality of pixels configured to generate associated distance signals based on corresponding clock signals from among the at least first and second clock signals and light reflected by an object, and a distance information deciding unit configured to determine distance information with respect to the object by using the associated distance signals. At least one first pixel from among the plurality of pixels is configured to generate the associated distance signal based on at least the first clock signal, and at least one second pixel, which is adjacent to at least one the first pixel, is configured to generate the associated distance signal based on at least the second clock signal.

The clock signal generator may be configured to generate third and fourth clock signals, the at least one first distance detecting pixel is configured to generate the associated distance signal based on the first clock signal and the third clock signal, and the at least one second distance detecting pixel is configured to generate the associated distance signal based on the second clock signal and the fourth clock signal.

The clock signal generator may generate the second clock signal having a phase difference with a period, the phase difference of the second clock signal being one-fourth (¼) of that of the phase difference of the first clock signal, the third clock signal having a phase difference with a period, the phase difference of the third clock signal being a half (½) of that of the phase difference of the first clock signal, and the fourth clock signal having a phase difference with a period, the phase difference of the fourth clock signal being a half (½) of that of the phase difference of the second clock signal.

The image sensor may further include an interpolation unit configured to interpolate distance information of each of the first plurality of pixels by using distance information of adjacent pixels.

The image sensor may further include a filter configured to filter infrared rays from light reflected by the object. Each of the first plurality of pixels is configured to generate the associated distance signal based on the corresponding clock signals and the infrared rays filtered by the filter.

According to another aspect of inventive concepts, an image sensor includes a clock signal generator configured to generate and output at least first and second clock signals, a plurality of color pixels configured to generate color signals corresponding to color information of an object based on light reflected by the object and a plurality of distance detecting pixels configured to generate the associated distance signals corresponding to distance information of the object based on corresponding clock signals from among the at least first and second clock signals and light reflected by the object, and a distance information deciding unit configured to decide distance information with respect to the object based on the distance signals. At least one first distance detecting pixel from among the plurality of distance detecting pixels is configured to generate the associated distance signal based on at least the first clock signal and at least one second distance detecting pixel from among the plurality of distance detecting pixels, which is adjacent to the at least one first distance detecting pixel, is configured to generate the associated distance signal based on at least the second clock signal.

The clock signal generator may be configured to generate third and fourth clock signals, the at least one first distance detecting pixel is configured to generate the associated distance signal based on the first clock signal and the third clock signal, and the at least one second distance detecting pixel is configured to generate the associated distance signal based on the second clock signal and the fourth clock signal.

The clock signal generator may generate the second clock signal having a phase difference with a period, the phase difference of the second clock signal being one-fourth (¼) of that of the phase difference of the first clock signal, the third clock signal having a phase difference with a period, the phase difference of the third clock signal being a half (½) of that of the phase difference of the first clock signal, and the fourth clock signal having a phase difference with a period, the phase difference of the fourth clock signal being a half (½) of that of the phase difference of the second clock signal.

The image sensor may further include an interpolation unit configured to interpolate distance information of each of the plurality of distance detecting pixels by using distance information of adjacent distance detecting pixels.

The image sensor may further include a filter configured to filter infrared rays from light reflected by the object. Each of the plurality of distance detecting pixels is configured to generate the associated distance signal based on the corresponding clock signals and the infrared rays filtered by the filter.

BRIEF DESCRIPTION OF THE DRAWINGS

Example embodiments of inventive concepts will be more clearly understood from the following detailed description taken in conjunction with the accompanying drawings in which:

FIG. 3 is a diagram partially showing pixels of the pixel array of FIG. 1;

FIG. 6 is a block diagram of an image sensor according to another example embodiment of inventive concepts;

DETAILED DESCRIPTION OF EXAMPLE EMBODIMENTS

Figure 1:
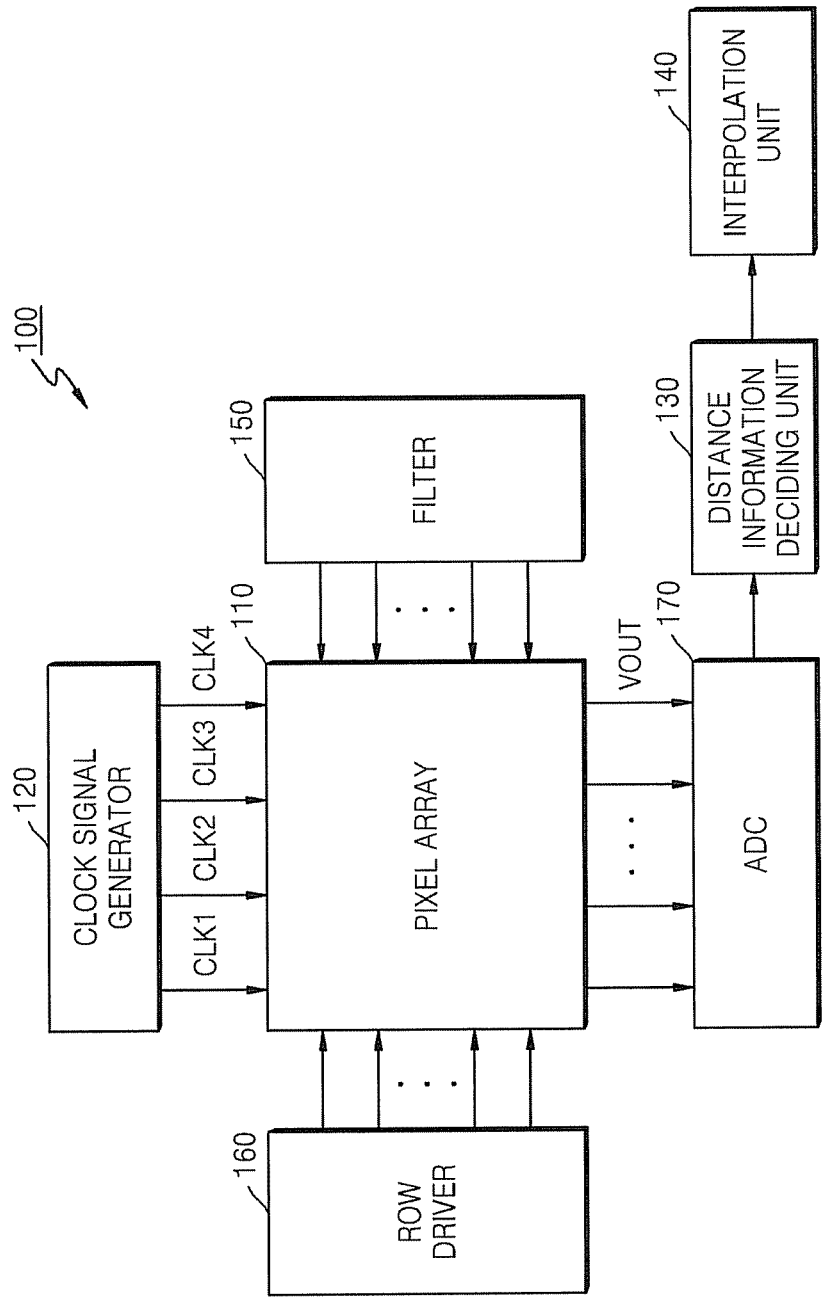
FIG. 1 is a block diagram of an image sensor according to an example embodiment of inventive concepts.

The attached drawings for illustrating example embodiments of inventive concepts are referred to in order to gain a sufficient understanding of inventive concepts, the merits thereof, and objectives accomplished by the implementation of inventive concepts.

Hereinafter, inventive concepts will be described in detail by explaining example embodiments with reference to the attached drawings. In the drawings, lengths and sizes of layers and regions may be exaggerated for clarity. Like reference numerals in the drawings denote like elements.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an image sensor 100 according to an example embodiment of inventive concepts.

Referring to FIG. 1, the image sensor 100 may include a pixel array 110, which includes a plurality of pixels, a clock signal generator 120, a distance information deciding unit 130, and an interpolation unit 140. Furthermore, the image sensor 100 may further include a filter 150, a row driver 160, and an analog-digital convertor (ADC) 170.

The clock signal generator 120 may generate first through fourth clock signals CLK1, CLK2, CLK3, and CLK4. The second clock signal CLK2 may have a phase difference with a period, which is one-fourth (¼) of that of the phase difference of the first clock signal CLK1. The third clock signal CLK3 may have a phase difference with a period, which is a half (½) of that of the phase difference of the first clock signal CLK1, and may have a phase difference with a period, which is one-fourth (¼) of that of the phase difference of the second clock signal CLK2. The fourth clock signal CLK4 may have a phase difference with a period, which is three-fourths (¾) of that of the phase difference of the first clock signal CLK1, may have a phase difference with a period, which is a half (½) of that of the phase difference of the second clock signal CLK2, and may have a phase difference with a period, which is one-fourth (¼) of that of the phase difference of the third clock signal CLK3. However, according to example embodiments of inventive concepts, the purposes of inventive concepts may be fulfilled even if the first through fourth clock signals CLK1, CLK2, CLK3, and CLK4 have phase differences that are close to, but not exactly the same as the phase differences described above.

The row driver 160 transmits control signals for operating corresponding pixel from among the pixels of the pixel array 110 to the corresponding pixels. Furthermore, the filter 150 filters domains of light reflected by an object, the domains required by the pixels, and transmits the filtered domains to the pixel array 110. For example, in the case where the image sensor 100 is about to detect distance information, the filter 150 may filter only infrared rays from light reflected by the object and transmit the filtered infrared rays to the pixel array 110.

Each of the pixels of the pixel array 110 may generate distance signals VOUT by using corresponding clock signals and light reflected by an object. The light reflected by the object may be light filtered by the filter 150. For example, one pixel may generate distance signals VOUT by using the first clock signal CLK1, the third clock signal CLK3, and the filtered light, and another pixel may generate distance signals VOUT by using the second clock signal CLK2, the fourth clock signal CLK4, and the filtered light. The configuration of the pixel array 110 will be described below in closer detail with reference to FIGS. 2A through 2C.

The ADC 170 may convert distance signals VOUT generated by each of the pixels into digital signals and output the digital signals.

The distance information deciding unit 130 may decide distance information with respect to the object by using distance signals VOUT output by each of the pixels. For example, the distance information deciding unit 130 may use distance signals VOUT, which are digital signals converted from analog distance signals VOUT output by each of the pixels. In other words, the distance information deciding unit 130 may decide the distance information by using digital signals output by the ADC 170.

The interpolation unit 140 may interpolate distance information of each of the pixels by using distance information of adjacent pixels. Operations of the interpolation unit 140 will be described below in closer detail with reference to FIG. 5.

The image sensor 100 may be a time-of-flight (TOF) sensor capable of detecting distance information with respect to the object.

Figure 2A:
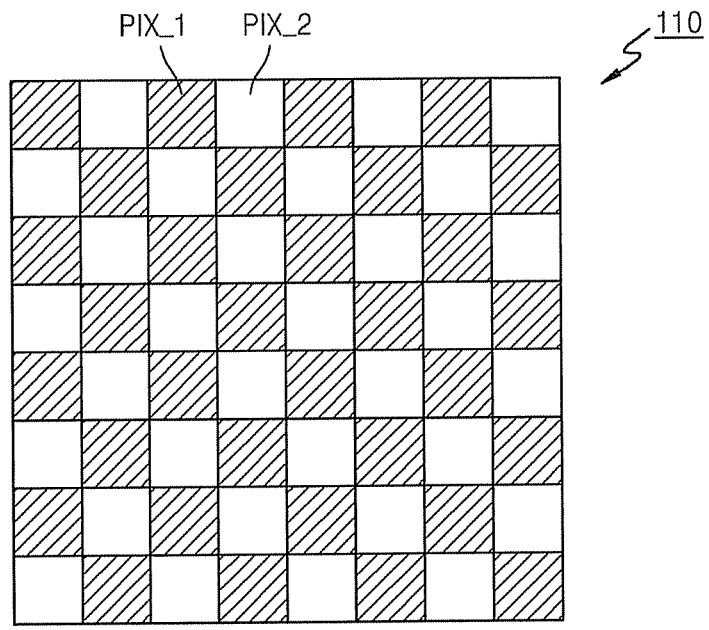
FIG. 2A is a diagram showing an example of a pixel array, according to an example embodiment.

FIG. 2A is a diagram showing an example of the pixel array 110, according to an example embodiment.

Referring to FIGS. 1 and 2A, the pixel array 110 may include a plurality of pixels. Hereinafter, for convenience of explanation, a pixel that generates distance signals VOUT by using the first clock signal CLK1 and the third clock signal CLK3 will be referred to as a first pixel PIX_1, and a pixel that generates distance signals VOUT by using the second clock signal CLK2 and the fourth clock signal CLK4 will be referred to as a second pixel PIX_2.

In FIG. 2A, the first pixel PIX_1 is indicated as a shaded pixel, and the second pixel PIX_2 is indicated as a blank pixel. In other words, the pixel contacting the first pixel PIX_1 using the first clock signal CLK_1 and the third clock signal CLK_3 at an edge is the second pixel PIX_2 to which the second clock signal CLK2 and the fourth clock signal CLK4 are applied.

Figure 2B:
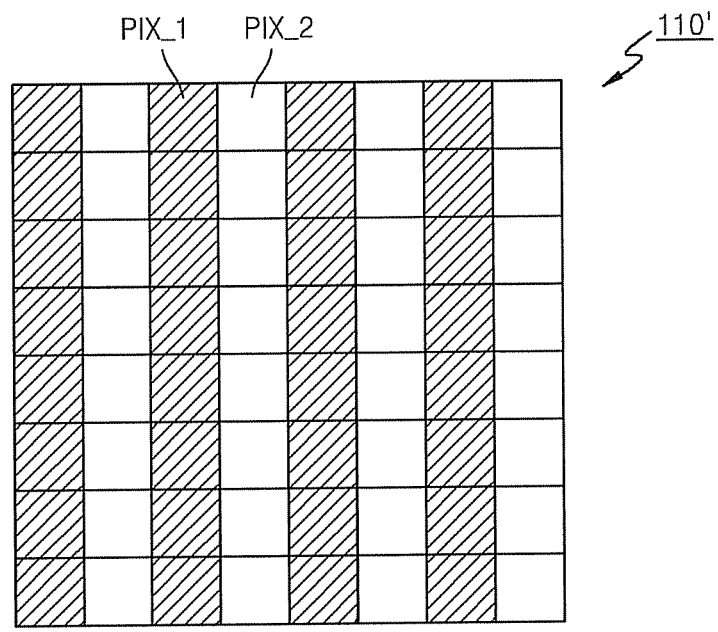
FIG. 2B is a diagram showing another example of the pixel array according to an example embodiment.

FIG. 2B is a diagram showing another example of the pixel array 110 of FIG. 1, a pixel array 110'.

Referring to FIGS. 1 and 2B, the embodiment of the FIG. 2B shows a case in which the second pixels PIX_2 are only formed next to two horizontally opposite sides of the first pixel PIX_1, and the first pixels PIX_1 are formed next to two vertical sides of the first pixel PIX_1.

Figure 2C:
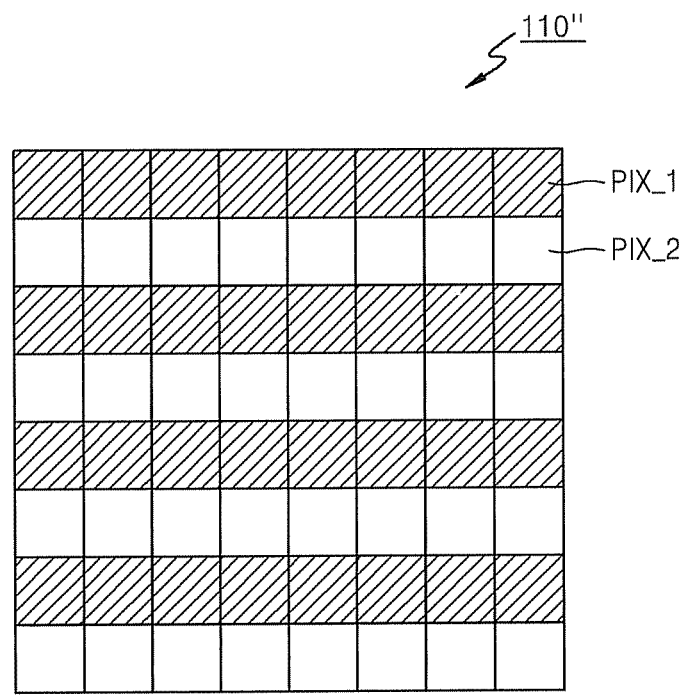
FIG. 2C is a diagram showing another example of the pixel array according to an example embodiment.

FIG. 2C is a diagram showing another example of the pixel array 110 of FIG. 1, a pixel array 110".

Referring to FIGS. 1 and 2C, the example embodiment of the FIG. 2C shows a case in which the second pixels PIX_2 are only formed next to two vertically opposite sides of the first pixel PIX_1, and the first pixels PIX_1 are formed next to two horizontal sides of the first pixel PIX_1.

FIGS. 2A through 2C show examples of the pixel array 110 of FIG. 1, according to example embodiments. However, inventive concepts are not limited thereto, and the first pixels PIX_1 and the second pixels PIX_2 may be arranged in any arrangement as long as interpolation as described below can be performed.

FIG. 3 is a diagram partially showing pixels of the pixel array 110 of FIG. 1.

Referring to FIGS. 1 through 3, the first pixel PIX_1 may include a first detecting unit 310 and a second detecting unit 320. The first detecting unit 310 may convert an infrared ray reflected by the object into a distance signal VOUT in response to the first clock signal CLK1. The second detecting unit 320 may convert an infrared ray reflected by the object into a distance signal VOUT in response to the third clock signal CLK3.

The second pixel PIX_2 may include a third detecting unit 330 and a fourth detecting unit 340. The third detecting unit 330 may convert an infrared ray reflected by the object into a distance signal VOUT in response to the second clock signal CLK2. The fourth detecting unit 340 may convert an infrared ray reflected by the object into a distance signal VOUT in response to the fourth clock signal CLK4.

Figure 4A:
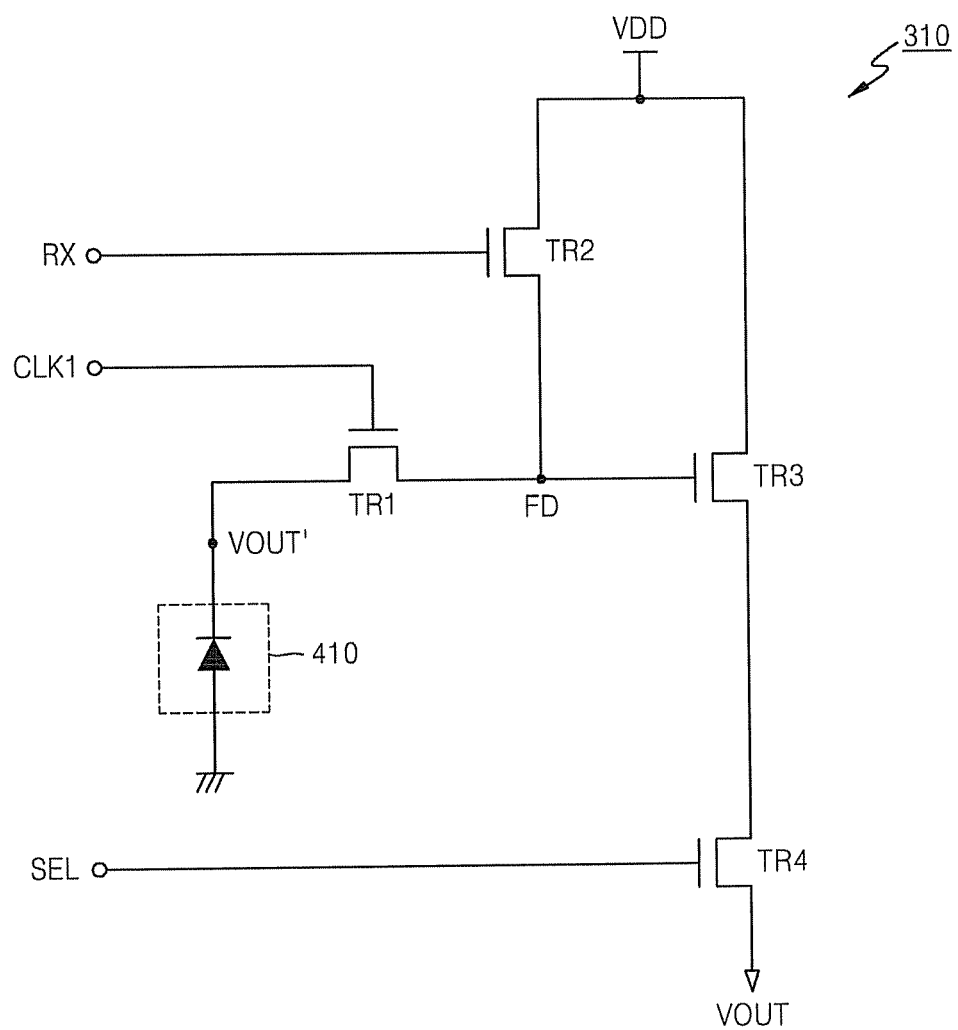
FIG. 4A is a circuit diagram showing an example of a first detecting unit of FIG. 3, according to an example embodiment.

FIG. 4A is a circuit diagram showing an example of the first detecting unit 310 of FIG. 3, according to an example embodiment. For convenience of explanation, only the first detecting unit 310 will be described below. However, the second through fourth detecting units 320, 330, and 340 may have the same configuration as the first detecting unit 310.

Referring to FIGS. 3 and 4A, the first detecting unit 310 may include a photo diode detecting unit 410 and first through fourth transistors TR1, TR2, TR3, and TR4. The photo diode detecting unit 410 may convert the infrared ray reflected by the object into the distance signal VOUT.

In the case where a row selecting signal SEL is enabled, the second transistor TR2 is turned on when reset control signals RX are enabled in each of the pixels of a selected row, whereas the first transistor TR1 is turned off when the first clock signal CLK1 is disabled. In this case, a power voltage VDD is applied to a floating diffusion (FD) node, and thus the first detecting unit 310 outputs the power voltage VDD as a signal VOUT.

Furthermore, in the case where a row selecting signal SEL is enabled, the second transistor TR2 is turned off when reset control signals RX are disabled in each of the pixels of a selected row, whereas the first transistor TR1 is turned on when the first clock signal CLK1 is enabled. In this case, a distance signal VOUT' detected by the photo diode detecting unit 410 is applied to the FD node, and thus the first detecting unit 310 outputs the distance signal VOUT' detected by the photo diode detecting unit 410 as the distance signal VOUT.

The ADC 170 of FIG. 1 may convert the distance signal VOUT according to the voltage level difference between a power voltage VDD and the distance signal VOUT' to a digital signal and output the digital signal. The row selecting signal SEL and the reset control signal RX may be generated by the row driver 160.

Figure 4B:
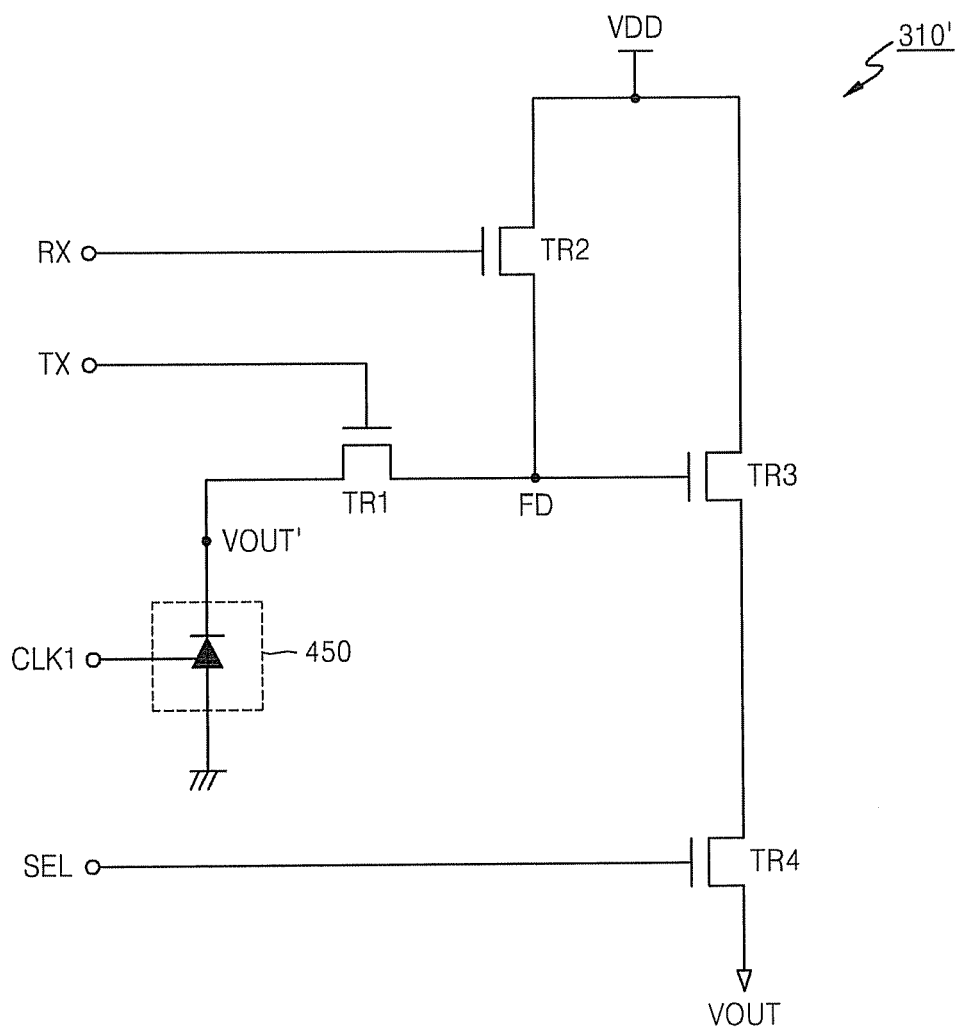
FIG. 4B is a circuit diagram showing another example of the first detecting unit of FIG. 3, according to another example embodiment.

FIG. 4B is a circuit diagram showing another example of a first detecting unit 310' of FIG. 3, according to another example embodiment. For convenience of explanation, only the first detecting unit 310' will be described below. However, the second through fourth detecting units 320, 330, and 340 may have the same configuration as the first detecting unit 310'.

Referring to FIGS. 3 and 4B, the first detecting unit 310' may include a photo gate detecting unit 450 and the first through fourth transistors TR1, TR2, TR3, and TR4. The photo gate detecting unit 450 may convert the infrared ray reflected by the object into the distance signal VOUT in response to the first clock signal CLK1. For example, the photo gate detecting unit 450 in the second detecting unit 320 may operate in response to the third clock signal CLK3, the photo gate detecting unit 450 in the third detecting unit 330 may operate in response to the second clock signal CLK2, and the photo gate detecting unit 450 in the fourth detecting unit 340 may operate in response to the fourth clock signal CLK4.

In the case where the row selecting signal SEL is enabled, the second transistor TR2 is turned on when reset control signals RX are enabled in each of the pixels of a selected row, whereas the first transistor TR1 is turned off when a transmission control signal TX is disabled. In this case, a power voltage VDD is applied to the FD node, and thus the first detecting unit 310 outputs the power voltage VDD.

Furthermore, in the case where a row selecting signal SEL is enabled, the second transistor TR2 is turned off when reset control signals RX are disabled in each of the pixels of a selected row, whereas the first transistor TR1 is turned on when the transmission control signal TX is enabled. Then, when the first clock signal CLK1 is enabled, the photo gate detecting unit 450 operates. Therefore, a distance signal VOUT' detected by the photo gate detecting unit 450 is applied to the FD node, and thus the first detecting unit 310 outputs the distance signal VOUT' detected by the photo gate detecting unit 450 as the distance signal VOUT.

The ADC 170 of FIG. 1 may convert the distance signal VOUT according to the voltage level difference between a power voltage VDD and the distance signal VOUT' to a digital signal and output the digital signal. The row selecting signal SEL, the reset control signal RX, and the transmission control signal TX may be generated by the row driver 160.

Figure 5A:
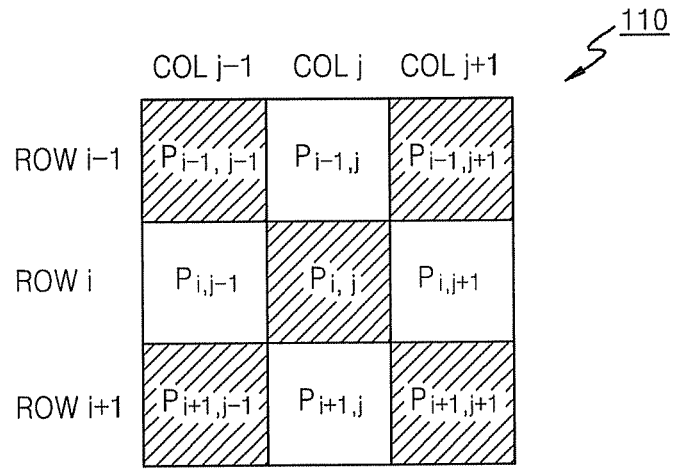
FIG. 5A is a diagram of the pixels for describing an operation of an interpolation unit of FIG. 1, according to an example embodiment.

FIG. 5A is a diagram of the pixels for describing an operation of the interpolation unit 140 of FIG. 1, according to an example embodiment.

It is assumed hereinafter that the distance information deciding unit 130 decides distance information of each of the pixels by using distance signals VOUT output by each of the pixels. In this case, the interpolation unit 140 may interpolate the distance information of each of the pixels by using distance information of adjacent pixels, and the operation will be described below in closer detail with reference to FIG. 5A. FIG. 5A shows a case in which the first pixels PIX_1 and the second pixels PIX_2 are arranged as shown in FIG. 2A.

It is assumed hereinafter that a pixel $P_{i,j}$ at an $i^{th}$ (i is a natural number equal to or greater than 2) row and a $j^{th}$ a is a natural number equal to or greater than 2) column is the first pixel PIX_1 operating in response to the first clock signal CLK1 and the third clock signal CLK3. Furthermore, it is assumed hereinafter that a pixel $P_{i,j-1}$ at the $i^{th}$ row and a $j-1^{th}$ column, a pixel $P_{i,j+1}$ at the $i^{th}$ row and a $j+1^{th}$ column, a pixel $P_{i-1,j}$ at an $i-1^{th}$ row and the $j^{th}$ column, and a pixel $P_{i+1,j}$ at an $i+1^{th}$ row and the $j^{th}$ column are the second pixels PIX_2 operating in response to the second clock signal CLK2 and the fourth clock signal CLK4.

The interpolation unit 140 may interpolate the distance information of the pixel $P_{i,j}$ by using the distance information of the pixels $P_{i,j-1}$, $P_{i,j+1}$, $P_{i-1,j}$ and $P_{i+1,j}$, which are adjacent to the pixel $P_{i,j}$. In other words, the distance information of the pixel $P_{i,j}$, which is decided by the distance information deciding unit 130, is distance information related to the first clock signal CLK1 and the third clock signal CLK3, and does not include distance information related to the second clock signal CLK2 and the fourth clock signal CLK4. Therefore, according to an example embodiment of inventive concepts, the distance information of the pixel $P_{i,j}$ related to the second clock signal CLK2 and the fourth clock signal CLK4 may be interpolated by using the distance information of the pixels $P_{i,j-1}$, $P_{i,j+1}$, $P_{i-1,j}$ and $P_{i+1,j}$ adjacent to the pixel $P_{i,j}$, because the distance information of the pixels $P_{i,j-1}$, $P_{i,j+1}$, $P_{i-1,j}$ and $P_{i+1,j}$ includes distance information related to the second clock signal CLK2 and the fourth clock signal CLK4.

For example, the distance information of the pixel $P_{i,j}$ related to the second clock signal CLK2 and the fourth clock signal CLK4 may be interpolated by using an average value of the distance information of the pixels $P_{i,j-1}$, $P_{i,j+1}$, $P_{i-1,j}$ and $P_{i+1,j}$ adjacent to the pixel $P_{i,j}$.

However, according to inventive concepts, it is not necessary to perform the interpolation by using distance information of four adjacent pixels, and the interpolation may be performed by using distance information of a different number of adjacent pixels as the occasion demands. For example, a pixel at an edge of the pixel array 110 may be interpolated by using the distance information of three adjacent pixels. Alternatively, in the case where the first pixels PIX_1 and the second pixels PIX_2 are arranged as shown in FIG. 2B or FIG. 2C, a pixel may be interpolated by using the distance information of two adjacent pixels. A method of interpolation in the case where the first pixels PIX1 and the second pixels PIX_2 are arranged as shown in FIG. 2B or FIG. 2B will be described below in closer detail with reference to FIG. 5B.

Figure 5B:
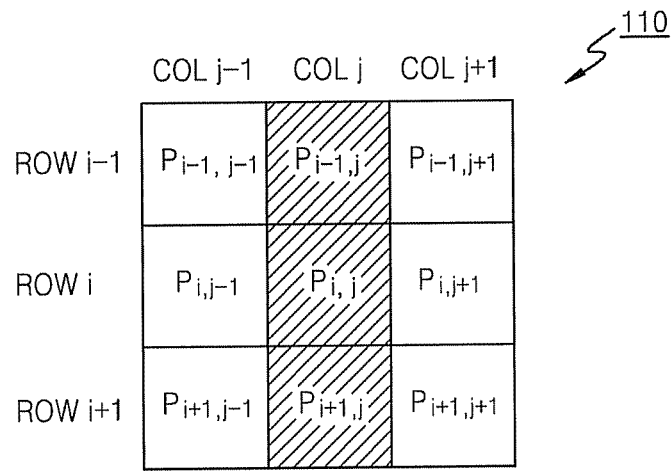
FIG. 5B is a diagram of the pixels for describing another operation of the interpolation unit of FIG. 1, according to an example embodiment.

FIG. 5B is a diagram of the pixels for describing another operation of the interpolation unit 140 of FIG. 1, according to an example embodiment.

Same as the description with reference to FIG. 5A above, it is assumed hereinafter that the distance information deciding unit 130 decides distance information of each of the pixels by using distance signals VOUT output by each of the pixels. Furthermore, it is assumed hereinafter that a pixel $P_{i,j}$ at an $i^{th}$ (i is a natural number equal to or greater than 2) row and a $j^{th}$ (j is a natural number equal to or greater than 2) column is the first pixel PIX_1 operating in response to the first clock signal CLK1 and the third clock signal CLK3. Furthermore, it is assumed hereinafter that a pixel $P_{i,j-1}$ at the $i^{th}$ row and a $j-1^{th}$ column and a pixel $P_{i,j+1}$ at the $i^{th}$ row and a $j+1^{th}$ column are the second pixels PIX_2 operating in response to the second clock signal CLK2 and the fourth clock signal CLK4.

The interpolation unit 140 may interpolate the distance information of the pixel $P_{i,j}$ by using the distance information of the pixels $P_{i,j-1}$ and $P_{i,j+1}$, which are adjacent to the pixel $P_{i,j}$. In other words, the distance information of the pixel $P_{i,j}$, which is decided by the distance information deciding unit 130, is distance information related to the first clock signal CLK1 and the third clock signal CLK3, and does not include distance information related to the second clock signal CLK2 and the fourth clock signal CLK4. Therefore, according to an example embodiment of inventive concepts, the distance information of the pixel $P_{i,j}$ related to the second clock signal CLK2 and the fourth clock signal CLK4 may be interpolated by using the distance information of the pixels $P_{i,j-1}$ and $P_{i,j+1}$ adjacent to the pixel $P_{i,j}$ because the distance information of the pixels $P_{i,j-1}$ and $P_{i,j+1}$ includes distance information related to the second clock signal CLK2 and the fourth clock signal CLK4.

For example, the distance information of the pixel $P_{i,j}$ related to the second clock signal CLK2 and the fourth clock signal CLK4 may be interpolated by using an average value of the distance information of the pixels $P_{i,j-1}$ and $P_{i,j+1}$ adjacent to the pixel $P_{i,j}$.

A pixel is interpolated by using the distance information of pixels adjacent to edges of the pixel to be interpolated in the embodiments shown in FIGS. 5A and 5B. However, in the case where the pixel array 110 is arranged in an arrangement different from those of FIGS. 2A through 2C, a pixel is interpolated by using the distance information of pixels adjacent to corners of the pixel to be interpolated.

For convenience of explanation, it is assumed above that the pixel $P_{i,j}$ is the first pixel PIX_1. In the case of FIG. 5A, when the pixel $P_{i,j}$ is the second pixel PIX_2 and pixels $P_{i,j-1}$, $P_{i,j+1}$, $P_{i-1,j}$ and $P_{i+1,j}$ adjacent to the pixel $P_{i,j}$ are the first pixels PIX_1, the pixel $P_{i,j}$ may be interpolated by using the same method described above with reference to FIG. 5A, and thus detailed descriptions thereof will be omitted below. Furthermore, in the case of FIG. 5B, when the pixel $P_{i,j}$ is the second pixel PIX_2 and pixels $P_{i,j-1}$ and $P_{i,j+1}$ adjacent to the pixel $P_{i,j}$ are the first pixels PIX_1, the pixel $P_{i,j}$ may be interpolated by using the same method described above with reference to FIG. 5B, and thus detailed descriptions thereof will be omitted below.

FIG. 6 is a block diagram of an image sensor 600 according to another example embodiment of inventive concepts.

Referring to FIG. 6, the image sensor 600 may include a pixel array 610, which includes a plurality of color pixels and a plurality of distance detecting pixels, a clock signal generator 620, a distance information deciding unit 630, and an interpolation unit 640. Furthermore, the image sensor 600 may further include a first row driver 660, a second row driver 670, a first ADC 680, and a second ADC 690.

The clock signal generator 620 may generate first through fourth clock signals CLK1, CLK2, CLK3, and CLK4. The second clock signal CLK2 may have a phase difference with a period, which is one-fourth (¼) of that of the phase difference of the first clock signal CLK1. The third clock signal CLK3 may have a phase difference with a period, which is a half (½) of that of the phase difference of the first clock signal CLK1, and may have a phase difference with a period, which is one-fourth (¼) of that of the phase difference of the second clock signal CLK2. The fourth clock signal CLK4 may have a phase difference with a period, which is three-fourths (¾) of that of the phase difference of the first clock signal CLK1, may have a phase difference with a period, which is a half (½) of that of the phase difference of the second clock signal CLK2, and may have a phase difference with a period, which is one-fourth (¼) of that of the phase difference of the third clock signal CLK3. However, according to an example embodiment of inventive concepts, the purposes of inventive concepts may be fulfilled even if the first through fourth clock signals CLK1, CLK2, CLK3, and CLK4 have phase differences that are close to, but not exactly the same as the phase differences described above.

The first row driver 660 transmits first control signals for operations of corresponding pixels from among the pixels of the pixel array 610 to the corresponding pixels. The second row driver 670 transmits second control signals for operations of corresponding pixels from among the pixels of the pixel array 610 to the corresponding pixels. For example, it is assumed that the first row driver 660 transmits the first control signals for controlling the distance detecting pixels related to distance information and the second row driver 670 transmits the second control signals for controlling color pixels related to color information. In this case, the first row driver 660 may transmit the first control signals to the distance detecting signals, and the second row driver 670 may transmit the second control signals to the color pixels.

FIG. 6 shows no element corresponding to the filter 150 of FIG. 1. However, the image sensor 600 of FIG. 6 may include a filter equivalent to the filter 150 of FIG. 1. The filter may filter domains required by the pixels from light reflected by an object and transmit the filtered domains to the pixel array 610. For example, the filter may filter only infrared rays from the light reflected by the object and transmit the filtered infrared rays to the distance detecting pixels. Furthermore, the filter may filter only visible rays from the light reflected by the object and transmit the filtered visible rays to the color pixels.

The pixel array 100 may include the color pixels and the distance detecting pixels. The color pixels may generate color signals VOUT2 corresponding to color information of the object by using the light reflected by the object. The distance detecting pixels may generate distance signals VOUT1 corresponding to distance information of the object by using corresponding clock signals and the light reflected by the object.

The light reflected by the object may be light filtered by the filter. For example, the color pixel may generate color signals VOUT2 by using visible rays filtered by the filter. The distance detecting pixels may generate distance signals VOUT1 by using infrared rays filtered by the filter and the corresponding clock signals. The configuration of the pixel array 610 will be described below in closer detail with reference to FIGS. 7 and 8.

The first ADC 680 may convert distance signals VOUT1 generated by each of the distance detecting pixels into digital signals and output the digital signals. The second ADC 690 may convert color signals VOUT2 generated by each of the color pixels into digital signals and output the digital signals.

The distance information deciding unit 630 may decide distance information with respect to the object by using distance signals VOUT1 output by each of the pixels. For example, the distance information deciding unit 630 may use distance signals VOUT1, which are digital signals converted from analog distance signals VOUT1 output by each of the distance detecting pixels. In other words, the distance information deciding unit 630 may decide the distance information by using signals output by the first ADC 680.

The interpolation unit 640 may interpolate distance information of each of distance detecting pixels by using distance information of adjacent distance detecting pixels. Operations of the interpolation unit 640 will be described below in closer detail with reference to FIG. 9.

Figure 7:
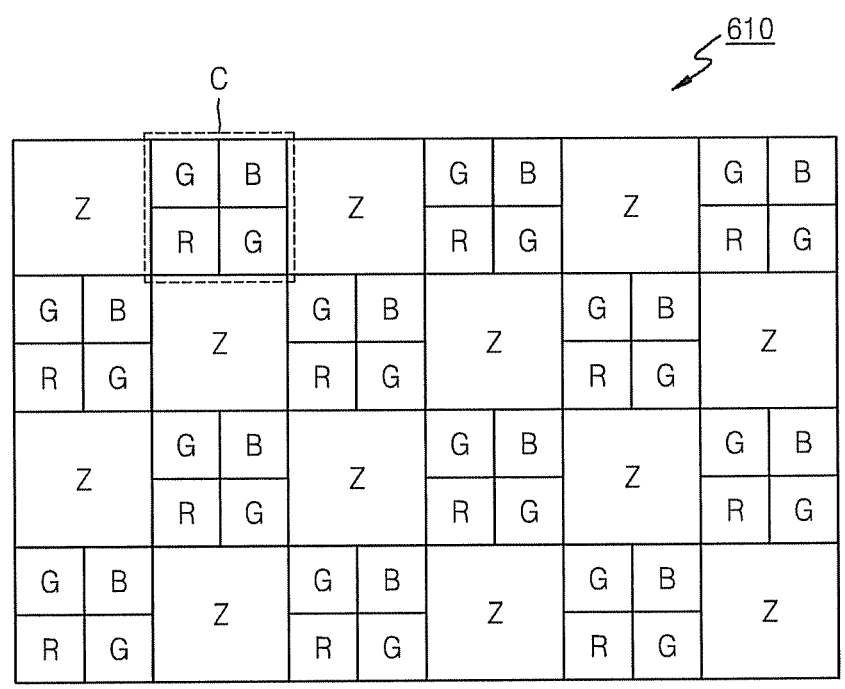
FIG. 7 is a diagram showing an example of a pixel array of FIG. 6, according to an example embodiment.

FIG. 7 is a diagram showing an example of the pixel array 610 of FIG. 6, according to an example embodiment.

Referring to FIGS. 6 and 7, the pixel array 610 may include a plurality of color pixels C and a plurality of distance detecting pixels Z. The color pixels C may output color signals VOUT2 related to three colors, that is, red (R), green (G), and blue (B).

Figure 8:
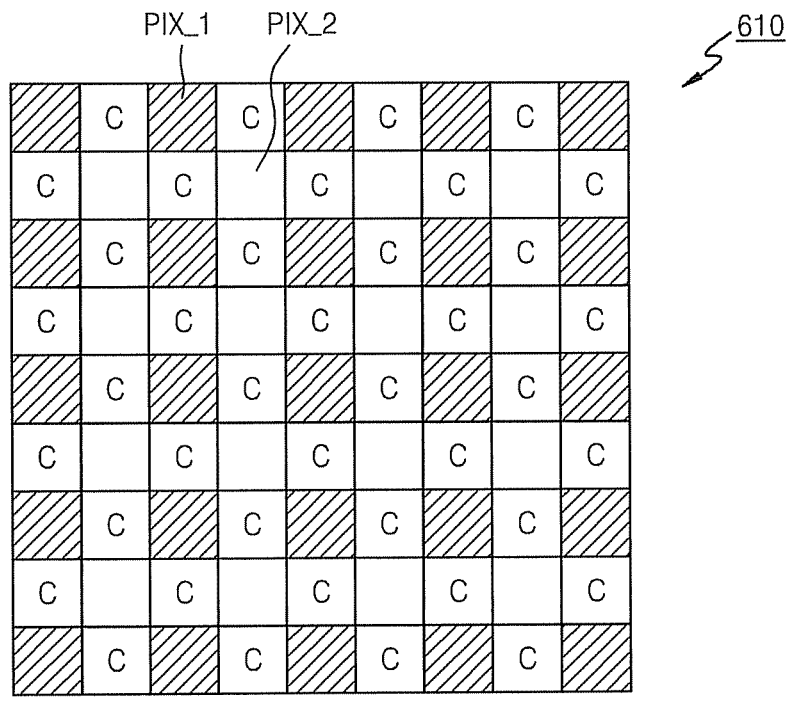
FIG. 8 is a diagram showing another example of the pixel array of FIG. 6, according to another example embodiment.

FIG. 8 is a diagram showing another example of the pixel array 610 of FIG. 6, according to another example embodiment.

Referring to FIGS. 6 through 8, pixels indicated by the reference "C" in FIG. 8 are the color pixels C, and pixels not indicated by a reference in FIG. 8 are the distance detecting pixels Z. Hereinafter, for convenience of explanation, the distance detecting pixels Z generating distance signals VOUT1 by using the first clock signal CLK1 and the third clock signal CLK3 will be referred to as first distance detecting signals PIX_1, and the distance detecting pixels generating distance signals VOUT1 by using the second clock signal CLK2 and the fourth clock signal CLK4 will be referred to as second distance detecting pixels PIX_2.

In FIG. 8, the first distance detecting pixel PIX_1 is indicated as a shaded pixel, and the second distance detecting pixel PIX_2 is indicated as a blank pixel. In FIG. 8, the first distance detecting pixel PIX_1 and the second distance detecting pixel PIX_2 are formed adjacent to each others. In other words, the pixel contacting the first distance detecting pixel PIX_1 using the first clock signal CLK_1 and the third clock signal CLK_3 at an edge is the second distance detecting pixel PIX_2 to which the second clock signal CLK2 and the fourth clock signal CLK4 are applied.

However, the pixel arrangement of the pixel array 610 according to inventive concepts are not limited to the pixel arrangement shown in FIG. 8, and the first pixels PIX_1 and the second pixels PIX_2 may be arranged in any arrangement as long as interpolation as described below can be performed.

Each of the distance detecting pixels of FIGS. 6 through 8 may include a plurality of detecting units, as described above with reference to FIG. 3. In other words, the first distance detecting pixel PIX_1 may include the first detecting unit 310 and the second detecting unit 320 of FIG. 3, and the second distance detecting pixel PIX_2 may include the third detecting unit 330 and the fourth detecting unit 340 of FIG. 3. Since embodiments of the operations and configurations of the first through fourth detecting units 310, 320, 330, and 340 are described above with reference to FIGS. 3 through 4B, detailed descriptions thereof will be omitted below.

Figure 9:
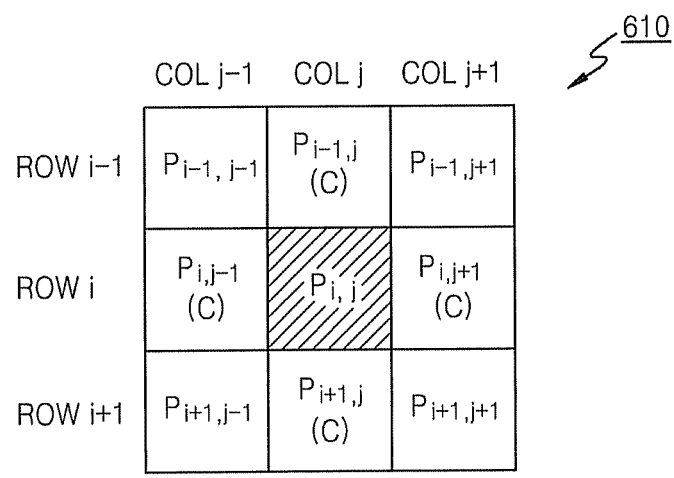
FIG. 9 is a diagram of an example of the pixel array including the color pixels and the distance detecting pixels for describing an operation of an interpolation unit of FIG. 6, according to another example embodiment.

FIG. 9 is a diagram of an example of the pixel array 610 including the color pixels and the distance detecting pixels for describing an operation of the interpolation unit 640 of FIG. 6, according to another example embodiment.

It is assumed hereinafter that the distance information deciding unit 630 decides distance information of each of the distance detecting pixels by using distance signals VOUT1 output by each of the distance detecting pixels. In this case, the interpolation unit 640 may interpolate distance information of each of the distance detecting pixels by using distance information of adjacent distance detecting pixels.

It is assumed hereinafter that a pixel $P_{i,j}$ at an $i^{th}$ (i is a natural number equal to or greater than 2) row and a $j^{th}$ (j is a natural number equal to or greater than 2) column is the first distance detecting pixel PIX_1 operating in response to the first clock signal CLK1 and the third clock signal CLK3. Furthermore, it is assumed hereinafter that a pixel $P_{i-1,j-1}$ at the $i-1^{th}$ row and a $j-1^{th}$ column, a pixel $P_{i-1,j+1}$ at the $i-1^{th}$ row and a $j+1^{th}$ column, a pixel $P_{i-1,j-1}$ at an i+1th row and the $j+1^{th}$ column, and a pixel $P_{i+1,j+1}$ at an i+1th row and the $j+1^{th}$ column are the second distance detecting pixels PIX_2 operating in response to the second clock signal CLK2 and the fourth clock signal CLK4. Furthermore, it is assumed hereinafter that a pixel $P_{i,j-1}$ at the $i^{th}$ row and a $j-1^{th}$ column, a pixel $P_{i,j+1}$ at the $i^{th}$ row and a $j+1^{th}$ column, a pixel $P_{i-1,j}$ at a $i-1^{th}$ row and the $j^{th}$ column, and a pixel $P_{i+1,j}$ at an $i+1^{th}$ row and the $j^{th}$ column are the color pixels C.

The interpolation unit 140 may interpolate the distance information of the distance detecting pixel $P_{i,j}$ by using the distance information of the distance detecting pixels $P_{i-1,j-1}$, $P_{i-1,j+1}$, $P_{i-1,j-1}$ and $P_{i+1,j+1}$, which are adjacent to distance detecting the $P_{i,j}$. In other words, the distance information of the pixel $P_{i,j}$, which is decided by the distance information deciding unit 630, is distance information related to the first clock signal CLK1 and the third clock signal CLK3, and does not include distance information related to the second clock signal CLK2 and the fourth clock signal CLK4. Therefore, according to an example embodiment, the distance information of the distance detecting pixel $P_{i,j}$ related to the second clock signal CLK2 and the fourth clock signal CLK4 may be interpolated by using the distance information of the distance detecting pixels $P_{i-1,j-1}$, $P_{i-1,j+1}$, $P_{i+1,j-1}$ and $P_{i+1,j+1}$ adjacent to the pixel $P_{i,j}$ because the distance info nation of the distance detecting $P_{i-1,j-1}$, $P_{i-1,j+1}$, $P_{i+1,j-1}$ and $P_{i+1,j+1}$ includes distance information related to the second clock signal CLK2 and the fourth clock signal CLK4.

For example, the distance information of the distance detecting pixel $P_{i,j}$ related to the second clock signal CLK2 and the fourth clock signal CLK4 may be interpolated by using an average value of the distance information of the distance detecting pixels $P_{i-1,j-1}$, $P_{i-1,j+1}$, $P_{i+1,j-1}$ and $P_{i+1,j+1}$ adjacent to the pixel $P_{i,j}$.

However, according to inventive concepts, it is not necessary to perform the interpolation by using distance information of four adjacent distance detecting pixels, and the interpolation may be performed by using distance information of a different number of adjacent distance detecting pixels as the occasion demands. For example, the distance information of a distance detecting pixel at an edge of the pixel array 610 may be interpolated by using the distance information of three adjacent distance detecting pixels. Furthermore, although a distance detecting pixel is interpolated by using the distance information of distance detecting pixels adjacent to edges of the distance detecting pixel to be interpolated in the embodiment shown in FIG. 9, a distance detecting pixel may be interpolated by using the distance information of distance detecting pixels adjacent to corners of the distance detecting pixel to be interpolated.

For convenience of explanation, it is assumed above that the pixel $P_{i,j}$ is the first distance detecting pixel PIX_1. When the distance detecting pixel $P_{i,j}$ is the second pixel PIX_2 and distance detecting pixels $P_{i-1,j-1}$, $P_{i-1,j+1}$, $P_{i+1,j-1}$ and $P_{i+1,j+1}$ adjacent to the distance detecting pixel $P_{i,j}$ are the first pixels PIX_1, the distance information of the distance detecting pixel $P_{i,j}$ may be interpolated by using the same method described above with reference to FIG. 9, and thus detailed descriptions thereof will be omitted below.

While inventive concepts have been particularly shown and described with reference to example embodiments thereof, it will be understood that various changes in form and details may be made therein without departing from the spirit and scope of the following claims.

What is claimed is:

1. An image sensor comprising:
a clock signal generator configured to generate and output at least first through fourth clock signals;
a plurality of pixels configured to generate associated distance signals based on corresponding clock signals from among the at least first through fourth clock signals and light reflected by an object; and
a distance information deciding unit configured to determine distance information with respect to the object by using the associated distance signals, wherein
at least one first pixel from among the plurality of pixels is configured to generate the associated distance signal based on at least the first clock signal and the third clock signal,
at least one second pixel from among the plurality of pixels, which is adjacent to the at least one first pixel, is configured to generate the associated distance signal based on at least the second clock signal and the fourth clock signal, and
the clock signal generator is configured to generate the second clock signal having a phase difference with a period, the phase difference of the second clock signal being one-fourth (¼) of that of the phase difference of the first clock signal, the third clock signal having a phase difference with a period, the phase difference of the third clock signal being a half (½) of that of the phase difference of the first clock signal, and the fourth clock signal having a phase difference with a period, the phase difference of the fourth clock signal being a half (½) of that of the phase difference of the second clock signal.

2. The image sensor of claim 1, wherein
the first pixel includes,
a first detecting unit configured to convert an infrared ray reflected by the object into the associated distance signal in response to the first clock signal, and
a second detecting unit configured to convert the infrared ray reflected by the object into the associated distance signal in response to the third clock signal, and
the second pixel includes,
a third detecting unit configured to convert the infrared ray reflected by the object into the associated distance signal in response to the second clock signal, and
a fourth detecting unit configured to convert the infrared ray reflected by the object into the associated distance signal in response to the fourth clock signal.

3. The image sensor of claim 2, wherein each of the first through fourth detecting units comprises a photo gate detecting unit configured to convert the infrared ray reflected by the object into the associated distance signal in response to the corresponding clock signal.

4. The image sensor of claim 2, wherein each of the first through fourth detecting units comprises:
a photo diode detecting unit configured to convert the infrared ray reflected by the object into the distance signal; and a transistor configured to transmit a distance signal output by the photo diode detecting unit in response to the corresponding clock signal.

5. The image sensor of claim 1, further comprising:
an interpolation unit configured to interpolate distance information of each of the plurality of pixels by using distance information of adjacent pixels.

6. The image sensor of claim 5, wherein the interpolation unit is configured to interpolate distance information of the at least one first pixel adjacent to the at least one second pixel based on an average value of the distance information corresponding to the at least one second pixel, and interpolate distance information of the at least one second pixel adjacent to the at least one first pixel based on an average value of the distance information of the at least one first pixel.

7. The image sensor of claim 1, further comprising:
a filter configured to filter infrared rays from light reflected by the object,
wherein each of the plurality of pixels is configured to generate the associated distance signal based on the corresponding clock signals and the infrared rays filtered by the filter.

8. The image sensor of claim 1, wherein the image sensor is a time-of-flight (TOF) sensor configured to detect distance information with respect to the object.

9. The image sensor of claim 1, wherein the plurality of pixels is a full pixel array.

10. An image sensor comprising:
a clock signal generator configured to generate and output at least first through fourth clock signals;
a plurality of color pixels configured to generate color signals corresponding to color information of an object based on light reflected by the object and a plurality of distance detecting pixels configured to generate the associated distance signals corresponding to distance information of the object based on corresponding clock signals from among the at least first through fourth clock signals and light reflected by the object; and
a distance information deciding unit configured to decide distance information with respect to the object based on the distance signals, wherein
at least one first distance detecting pixel from among the plurality of distance detecting pixels is configured to generate the associated distance signal based on at least the first clock signal and the third clock signal,
at least one second distance detecting pixel from among the plurality of distance detecting pixels, which is adjacent to the at least one first distance detecting pixel, is configured to generate the associated distance signal based on at least the second clock signal and the fourth clock signal, and
the clock signal generator is configured to generate the second clock signal having a phase difference with a period, the phase difference of the second clock signal being one-fourth (¼) of that of the phase difference of the first clock signal, the third clock signal having a phase difference with a period, the phase difference of the third clock signal being a half (½) of that of the phase difference of the first clock signal, and the fourth clock signal having a phase difference with a period, the phase difference of the fourth clock signal being a half (½) of that of the phase difference of the second clock signal.

11. The image sensor of claim 10, wherein
the at least one first distance detecting pixels includes,
a first detecting unit configured to convert an infrared ray reflected by the object into the associated distance signal in response to the first clock signal, and
a second detecting unit configured to convert the infrared ray reflected by the object into the associated distance signal in response to the third clock signal, and
the at least one second distance detecting pixels includes,
a third detecting unit configured to convert the infrared ray reflected by the object into the associated distance signal in response to the second clock signal, and
a fourth detecting unit configured to convert the infrared ray reflected by the object into the associated distance signal in response to the fourth clock signal.

12. The image sensor of claim 11, wherein each of the first through fourth detecting units comprises a photo gate detecting unit configured to convert the infrared ray reflected by the object into the associated distance signal in response to the corresponding clock signal.

13. The image sensor of claim 11, wherein each of the first through fourth detecting units comprises:
a photo diode detecting unit configured to convert the infrared ray reflected by the object into the distance signal; and
a transistor configured to transmit a distance signal output by the photo diode detecting unit in response to the corresponding clock signal.

14. The image sensor of claim 10, further comprising:
an interpolation unit configured to interpolate distance information of each of the plurality of distance detecting pixels by using distance information of adjacent distance detecting pixels.

15. The image sensor of claim 14, wherein the interpolation unit is configured to interpolate distance information of the at least one first distance detecting pixel adjacent to the at least one second distance detecting pixel based on an average value of the distance information corresponding to the at least one second distance detecting pixel, and interpolate distance information of the at least one second distance detecting pixel adjacent to the at least one first distance detecting pixel based on an average value of the distance information of the at least one first distance detecting pixel.

16. The image sensor of claim 10, further comprising:
a filter configured to filter infrared rays from light reflected by the object,
wherein each of the plurality of distance detecting pixels is configured to generate the associated distance signal based on the corresponding clock signals and the infrared rays filtered by the filter.

* * * * *